United States Patent
Jarman

[15] 3,670,611
[45] June 20, 1972

[54] SHEAR DISCHARGE CONVEYING SYSTEM

[72] Inventor: David J. Jarman, 3520 Michigan, Cincinnati, Ohio 45208

[22] Filed: Jan. 6, 1971

[21] Appl. No.: 104,289

[52] U.S. Cl. .................................83/81, 83/89, 83/96, 83/104, 83/155, 83/157, 83/165, 83/167
[51] Int. Cl. ..................................................B23d 33/00
[58] Field of Search................83/81, 89, 96, 104, 155, 157, 83/165, 167

[56] References Cited

UNITED STATES PATENTS

| | | | |
|---|---|---|---|
| 2,793,693 | 5/1957 | Menk | 83/157 |
| 2,933,966 | 4/1960 | Dehn | 83/157 X |
| 3,260,145 | 6/1966 | Giordano | 83/157 X |
| 3,600,995 | 8/1971 | Hanni | 83/157 |

Primary Examiner—Frank T. Yost
Attorney—Alter, Weiss & Whitesel

[57] ABSTRACT

A portable automatic shear discharge conveying system which operates in conjunction with squaring shears to automate the shearing operation. The system comprises a unique conveyor which includes camless support units for supporting the material being sheared. The support units drop down automatically as the shear cut commences. The support units are raised automatically after the sheared material passes by. A scrap separator is provided at the rear of the conveyor which causes the scrap to be delivered to one bin and sends the sheared material to a stacker that is equipped for stacking odd shaped cuts. The stacker frame integrally includes the surge tank for the compressed air circuit used in controlling the conveyor system and stacker.

10 Claims, 10 Drawing Figures

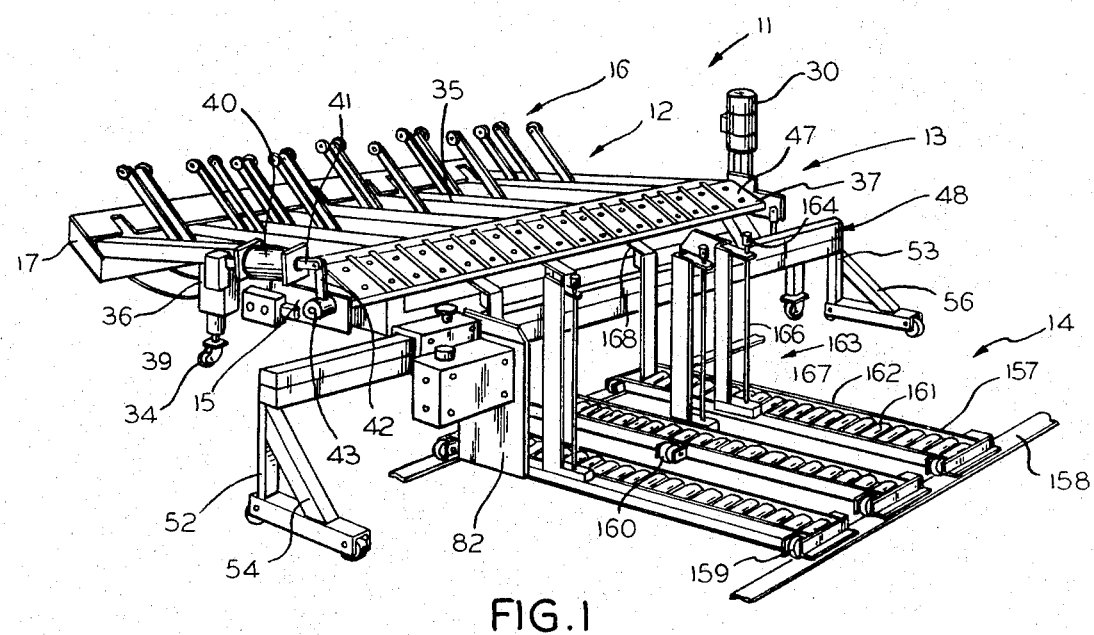

INVENTOR
DAVID J. JARMAN

BY
Alter, Weiss and Whitesel
ATTORNEYS

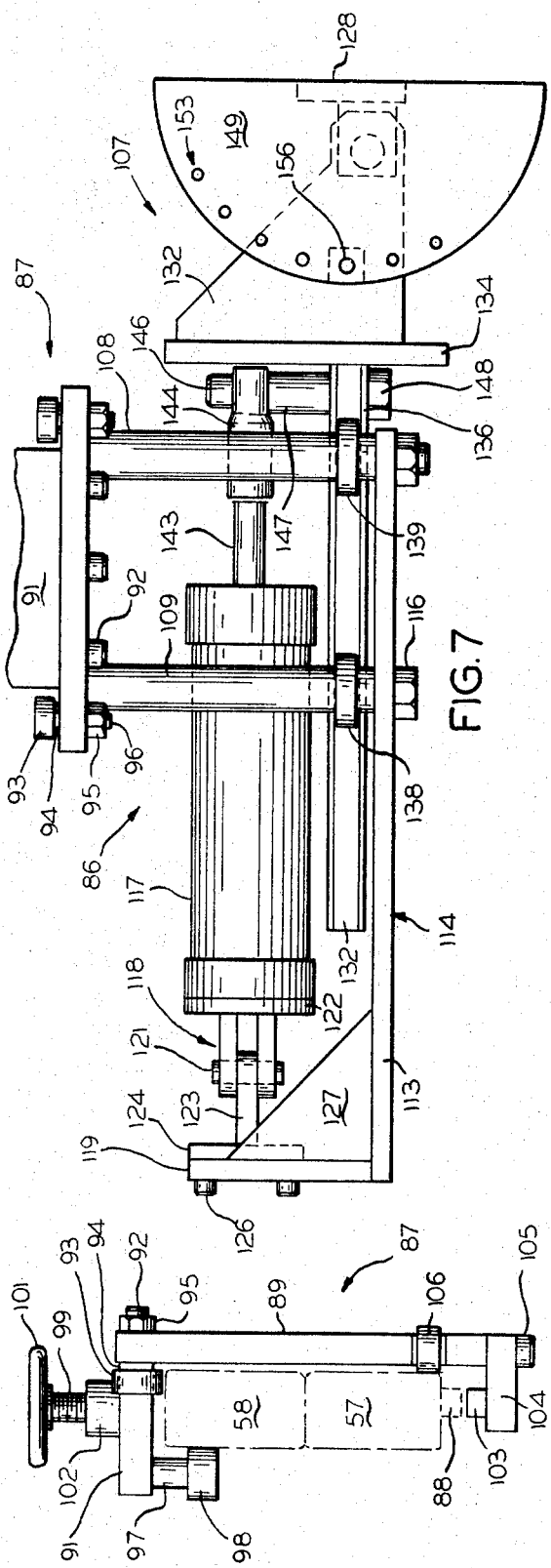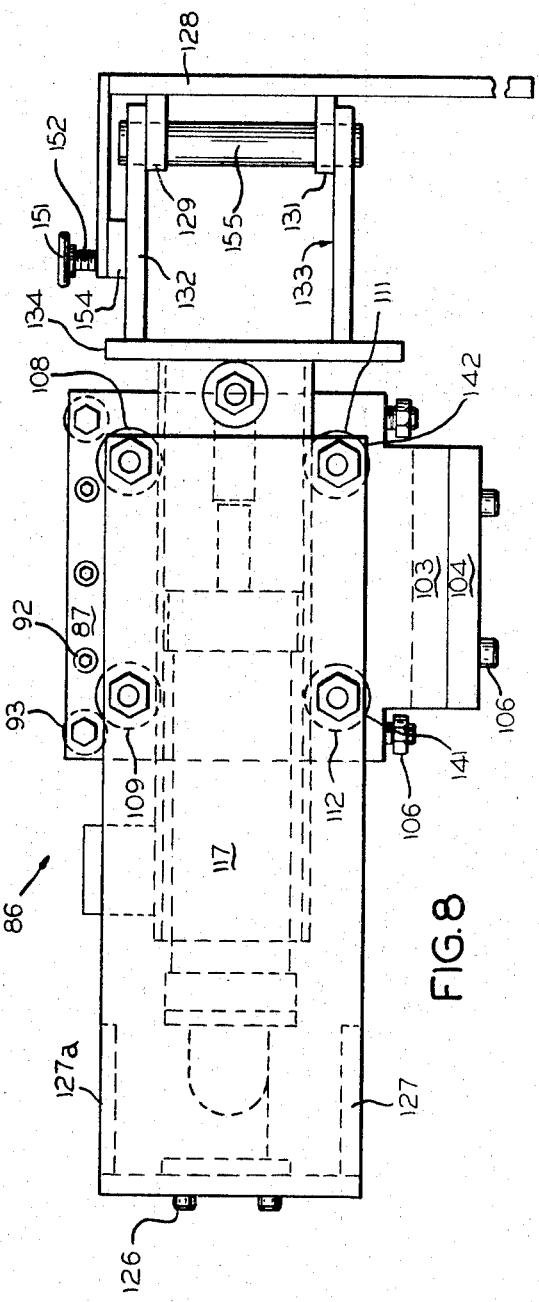

SHEAR DISCHARGE CONVEYING SYSTEM

This invention relates to conveying systems and more particularly to conveying systems for use with squaring shears.

There are conveying systems presently available for use with squaring shears. The function of the conveying system is to transport the sheared material from the rear of the shear to an intermediate storage position where the sheared material is stacked according to its size and shape.

The presently available conveying systems provide supports for holding the material to be sheared prior to the descent of the blade in the shearing operation. The supports are moved up and down using cam mechanisms. The cam mechanisms, of course, require cam component lubrication on a per use basis as well as on a time basis. Despite the lubrication, the cam mechanism inherently uses bearing surfaces, which are subject to wear. In addition, the up and down movement of the supports using the cam mechanism is relatively slow. The scrap separator blades of the scrap separators presently available on conveyors are cam operated and subject to the above mentioned problems.

Presently available shearing conveying systems are capable of handling one size at a time. This restriction on the capabilities obviously diminishes the usefulness and efficiency of the conveyor systems.

The stacker arrangements presently available are also capable of only handling squared cut material. This restriction inhibits and tends to cancel the advantages of the automation provided by the conveyor systems when irregular cuts are made on the material being processed.

Accordingly, it is an object of this invention to provide new and unique shear discharge conveying systems.

A more particular object of this invention is to provide shear discharge conveying systems, which are capable of handling a variety of sizes simultaneously; that is, both in conveying trapezoidly shaped material along with rectangularly shaped material away from the rear of the shear and also stacking the conveyed material.

A further object of the present invention is to provide camless support units for supporting the material prior to it being cut by the shears. The camless support units operate under the control of a timer to drop below the level of the conveyor chains after the cut and to thereafter raise to the full support height automatically.

Yet, a further object of the present invention is to automatically separate the scraps from the cut material through the use of a time controlled camless scrap separator blade.

Still another object of this present invention is to provide a unique stacker arrangement, wherein the frame of the stacker acts as the surge tank of the fluid system thus removing the necessity of utilizing separate tanks, and thereby simplifying to a great extent the entire fluid control system.

A preferred embodiment of the shear discharge conveying system comprises a portable conveyor unit conforming to the shear size. The front of the conveyor unit includes support units that automatically lower responsive to the operation of the back gauge angle of the shear. The support units remain depressed for a fixed time period to enable the uninhibited passage thereover of the sheared material. The sheared material and scrap are transported by the conveyor system which includes belts or chains of various widths to enable handling different size cuts at the same shear station.

A scrap separator blade at the end of the shear is positioned to enable the shared material to pass over ball transfers on the top of the scrap separator blade and onto a stacker. Responsive to a timing circuit signal, the blade raises up when the scrap material is being transported thereto. The raised blade uncovers a scrap bin into which the scrap pieces fall.

The stacker includes a hollow rail frame that acts as the accumulator or surge tank for the fluid control system including the tampering blades of the stacker. Angled tampering blades are utilized to enable the stacker to handle shaped pieces of material that have been sheared at angles. The angled blades provide a neat efficient stack of sheared material.

The above mentioned and other features and objects of this invention and the manner of obtaining them will become more apparent, and the invention itself will be best understood by reference to the following description of the embodiment of the invention taken in conjunction with the accompanying drawings, wherein:

FIG. 1 is a pictorial view of the inventive shear discharge conveying system looking from the rear or stacker end thereof;

FIG. 1a shows details of the operation of the support units;

FIG. 2 is a side pictorial view of the inventive shear discharge conveying system shown in FIG. 1;

FIG. 6 shows the saddle rail assembly utilized for mounting the stacker tampering unit to the rail;

FIG. 7 is a plan view of the saddle and bracket tamper assembly;

FIG. 8 is a rear view of the saddle and tamper assembly of FIG. 7; and

Figure 3:
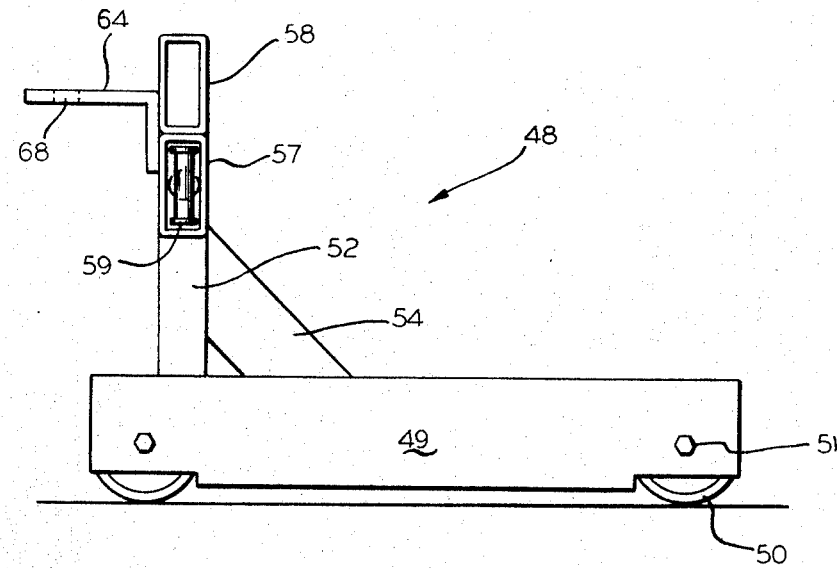
FIG. 3 is a side view of the stacker portion of the shear discharge conveying system.
Figure 4:
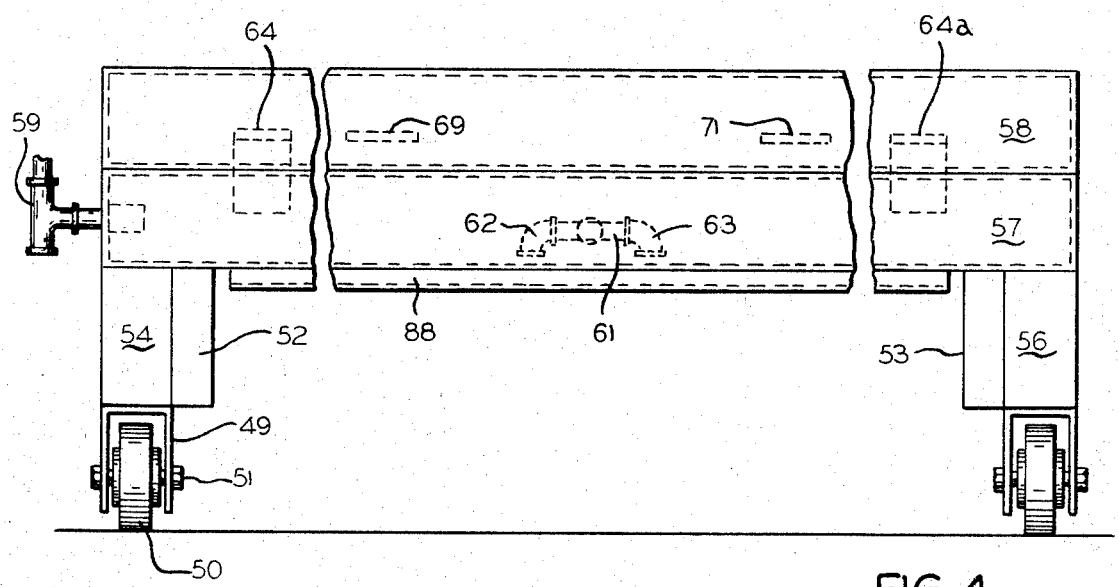
FIG. 4 is a rear view of the stacker arrangement of FIG. 3.

FIGS. 1 and 2 show an assembled conveying system at No. 11 comprising a conveyor unit 12, a scrap discrimator 13 and a stacker assembly 14.

The conveyor unit 12 includes means, such as support units 16 for supporting the sheet material being sheared. The support units are normally held in the up position, as shown in FIGS. 1 and 2. At the front of the conveyor 12, a shear mating or conforming plate 17, attached to frame 15, is provided. The mating plate is raised at an angle to enable the sheared material to slide down the plate and onto the conveyor belt or chain, thereby minimizing the jarring normally caused when the plate material falls onto the conveyor chain. It should be noted that the individual chains comprising the conveyor belt or endless chain 18 are of different sizes. For example, there is shown the comparatively wide conveyor chain 19 and the comparatively narrow chains 21, 22 and 23. The variation in size of the conveyor belts enables the simultaneous use of the conveyor system in shearing and conveying different size materials and/or different size cuts.

The support units 16 support the material being sheared while it is being back gauged. More particularly, the support unit 16 normally is held to extend upward, as shown in FIGS. 1, 2 and FIG. 1a. Responsive to the operation of a control, such as a limit switch actuated by the movement of the back gauge, a valve is electrically operated to enable air to enter cylinder 24 and thereby cause piston 26 of that cylinder to extend. The extension of piston 26 rotates shaft 27 and actuates all support units attached to the shaft 27.

The support units comprise a standard 28 to which there is shown rotatably attached thereto a supporting castor or wheel, such as wheel 29, which is covered with a material such as rubber for absorbing shock of the material moving thereover. It should be understood that the support units could utilize runners in place of the castors.

In the exemplary conveyor system 11, there are three shafts, such as shaft 27 controlling three rows of support units 16a, 16b and 16c. When air is channeled into the proper part of cylinder 24, the piston 26 extends and the wheel 29 rotates around shaft 27 until it is below the level of the conveyor chains so that the support units do not inhibit the movement of the sheared material.

Means are provided for causing the endless chains to move. More particularly, motor means, such as motor assembly 30 is provided for driving a drive shaft (not shown) having the well known driving sprockets affixed thereto. The sprockets fit into the conveyor chain and cause the movement of the chain around a drive sprocket wheel, such as sprocket wheel 32. The sprocket wheels rotate around a stationary shaft 33 responsive to the movement of the conveyor chain.

The motor means comprises an electrical three phase motor 31 which drives a gear drive 31a. The geared drive actuates the drive shaft to move the endless chains over substantially horizontal members, such as member 35 attached to frame 15.

Means are provided for moving the conveyor unit into position under the shear. More particularly, the unit is made portable by the castor assemblies, such as foot castor 34 mounted to an adjustable length foot 36, which is appended from the frame 15 of the conveyor.

The end of the conveyor unit 12 is equipped with means for separating the scrap from the sheared material. More particularly, a scrap separator blade 37 is provided. The blade 37 operates responsive to means such as foot switch 38. The foot switch operates an air valve 39 to cause piston 40 of cylinder 41 to extend. Responsive to the extension of piston 41 operating through arm 42, shaft 43 rotates and raises blade 37, which is fixedly attached thereto a vertical position. When the blade 37 is in the vertical position, then any metal on the conveyor 18 drops into scrap bin 44.

The scrap bin is shown as being mounted on scrap bin castor assemblies, such as castor assembly 46 so that when the scrap bin is reasonably full, it can be readily removed and be replaced with an empty scrap bin. It should be understood that the operation of blade 37 can be triggered or actuated by the operation of the shear or by the operation of a manual switch, such as foot switch 38. In either case, a time delay is inserted so that the sheared material passes over blade 37 in its normally closed position. It should be noted that means are provided for assuring the smooth passage of the material over the blade and onto the stacking assembly. More particularly, ball bearing mountings, such as ball bearing mounting 47, are fitted into the blade to carry the material thereover and onto the stacker assembly 14.

The stacker assembly 14 comprises the stacker rail assembly 48 best seen in FIG. 3. The stacker rail assembly includes a pair of wheel support tubes, such as support tube 49. The support tubes are each coupled to the two wheels, such as wheel 50 to make the stacker assembly completely portable. The wheels, such as wheel 50, are attached to axles, such as axle 51.

The support tube 49 supports upright standards at each side of the stacker rail assembly, such as standards 52 and 53, on opposite sides of the stacker rail assembly. Strengthening each standard is a side brace such as side brace 54 associated with standard 52 and side brace 56, associated with standard 53. The standards in turn support a pair of hollow rectangular tubes 57 and 58, which extend the width of the rail assembly. The hollow tubes act as the system surge tank. This obviates the necessity of providing extra surge tanks for the system.

Means are provided for attaching the surge tank into the system. More particularly, a fitting such as tee 59 is shown attached at one end of the tube 57. The high pressure supply line is attached to the tee along with a valve for use in controlling an air cylinder, for example. Similarly, there is shown another tee fitting 61 attached at the middle of tube 57. Tee 61 is shown with elbows 62 and 63 attached to either free end of the tee 61 for attachment to the high pressure line and to a control valve, respectively. It should be understood that another tee could be connected to the other end of the tube if so desired.

Means, such as connecting brackets 64, 64a are provided for attaching the stacker assembly to the conveyor unit. The connection is actually best seen in FIG. 2, where the bracket 64 is shown connected to the cantilevered or overlapping portion of the conveyor assembly.

Means are provided for securing this attachment. More particularly, a pin, such as pin 66, shown in FIG. 2 passes through the cantilevered portion 67 of the conveyor frame and through aperture 68 of connecting bracket 64 to provide a rigid and secure attachment of the stacker assembly to the conveyor unit. Without such an attachment, the stacker assembly would move away from the conveyor unit when the sheared metal material falls onto the stacker.

Scrap box bumpers or guards, such as guards 69 and 71 are provided for protecting the stacker assembly from the scrap box, as it is removed and placed into position. The guards are sheet metal members welded to the hollow tube 58 and extending frontward therefrom.

Figure 5:
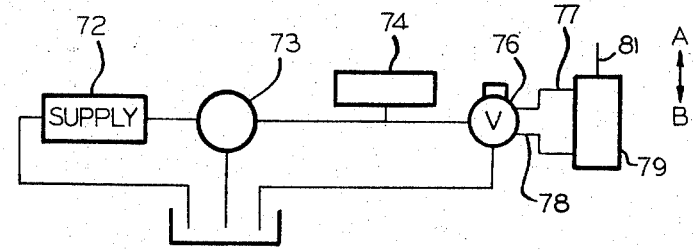
FIG. 5 is a representative fluid control schematic.

FIG. 5 best shows the basic fluid schematic for the pneumatic (or hydraulic) cylinder, such as used in the operation of the stacker assembly and the system. It should be understood that this is a simplified schematic. A high pressure supply 72 is shown attached through a master on-off control valve 73, which sends the fluid, such as air, through a tee coupling to a surge tank 74 and a work cylinder control valve 76. The tank 74, of course, is comprised of hollow tubes 57, 58, which are integral parts of the frame of the stacker unit 48.

The valve 76 operates responsive to control signals to cause pressurized air to flow either through line 77 or 78 to cylinder 79 thereby causing piston 81 to move either in the direction of arrow A or B to accomplish work such as tampering the tamper plates on the stacker or the motion of the blade 47 on the conveyor.

Means are provided for stacking the cut material. More particularly, tamper plates are provided on the stacker assembly which can be actuated in a reciprocating back and forth motion to force the plates falling onto the stacker assembly from the conveyor into a neat and orderly pile. More particularly, the stacker assembly 14 includes tamper plates, such as plate 82 shown in FIG. 1 or plates 83 or 84, shown in FIG. 2.

Means are provided for positioning these plates along the conveyor into different selected positions so that the tampering plates can adapt to sheared sheets of different sizes as well as of different shapes. In addition, means are provided for reciprocatingly actuating the plates. For example, the cylinder 79 of FIG. 5 can be utilized to actuate the tamper plate.

The means for positioning the plates comprises the saddle and bracket tamper plate assembly 86, shown in FIGS. 7 and 8. The saddle and bracket tamper plate assembly depends from a saddle rail assembly 87, best seen in FIG. 6. The saddle rail assembly is a mobile clamping arrangement that slides along the rail comprising upper and rectangular tubes 57 and 58 of the stacker unit 48. It should be noted that the lower tubular rail unit 57 is shown having depending from the bottom thereof a clamp rail 88. The clamp rail 88 is preferably a rack to assure a secure fixed position of the saddle rail assembly.

The saddle rail assembly comprises a carrier plate 89 which extends above and below the tops of tube units 57 and 58. A top plate 91 is connected to the carrier plate 89 by any well known means, such as Allen head screw 92, which extends into threaded holes in plate 91. Bearing means such as cameral bearing 93, spacer 94 are connected to plate 89 by means such as flex-lock nut 95 which is threaded onto axle 96. Such a bearing means is provided on both sides of saddle top plate 91 and are contiguous to tube 58.

At the rear of top plate 91 and depending downward therefrom is spacer 97, which keeps another pair of cameral bearings, such as bearing 98 spaced apart from top plate 91 so as to provide a grip sufficiently far down on top bracket 58 to reliably hold the saddle rail assembly on the rails or hollow tubes 57 and 58. The saddle rail assembly is pushed along the rail to a desired location. Then clamping screw 99 is operated by turning handle 101 until the screw reaches through threaded bushing 102 and abuts against the top of tube 58 to lift the saddle rail assembly 87 and cause the clamp rack rail 103 to abut against and mesh with the bottom rack 88. The clamp rack 103 is coupled to the carrier plate 89, since it is welded or otherwise connected to bottom clamp plate 104, which is in turn connected to the carrier plate by means, such as cap screw 105. Another pair of cameral bearings, such as bearing 106 is mounted juxtaposed to the back of tube 57.

A bracket tamper assembly 107 is coupled to the carrier saddle rail assembly 87 through means, such as extension supports 108, 109, 111 and 112. The extension supports are preferably threaded at both ends. The far ends thread into threaded holes in the carrier plate 89 until the unthreaded portion of the extension support abuts the carrier plate. The other end of the extension supports slip through holes in the cover plate 113 of cylinder mount assembly 114. A hex nut 116 is shown threaded over the threaded end of the extension support until it abuts against the cover plate 113 of the cylinder mount assembly 114. In the preferred embodiment of the saddle and bracket tamper assembly, internal lock washers are used for holding the nut 116 in place.

Means are provided for moving the tamper plate. More particularly, either an air or hydraulic cylinder, such as air cylinder 117 is attached by its clevis end 118 to the cylinder mount base plate 119. A clevis pin 121 passes through the clevis attached to the end cap 122 of the cylinder and also through attaching bar 123, which is fixed to bar plate 124 as by welding, or the like. The bar plate 124 is attached to base plate 119 with threaded fasteners, such as Allen head cap screw 126. A gusset 127 couples end plate 119 to cover plate 113 and assures rigidity of the structure 114.

Assembly 107 comprises adjustable angle plate 128 which is the plate that actually abuts the cut material during the tampering step. Tamper pivots 129 and 131 attached to the adjustable angle plate 128 are used for connecting the adjustable angle plate to the tamper hinges 132 and 133, respectively. The tamper hinges in turn are welded or otherwise connected to connecting plate 134. Connecting plate 134 has rail unit or slide 136 attached thereto. Rail unit 136 has a top and a bottom groove, such as groove 137, shown on the top thereof in FIG. 7.

Bearing rollers, such as rollers 138, 139, 141 and 142 are mounted to the extension supports and fit into the grooves to enable assembly 107 to move backwards and forwards as the cylinder rod 143 of cylinder 117 moves backwards and forwards. The rod has eyelet 144 attached thereto. A fastener, such as socket head cap screw 146 goes through eyelet 144, spacer 147, rail assembly 136 and is held in place by hex nut 148. Thus, as the cylinder rod 143 reciprocatingly moves, the assembly 107 slides back and forth as the rail 136 moves back and forth. The bearing rollers (camerals) enable the movement of the assembly 107.

Means are provided for selectively setting the angle of plate 128. More particularly, a top locking plate 149 is utilized to select angular settings for the adjustable angle plate 128. A knob 151 attached to a screw 152 is used to fix plate 149 at the angular setting desired. For example, screw 152 is placed through a hole of the group of holes 153 in plate 149. Then, the screw is turned using knob 151 when the selected hole is aligned with a threaded aperture in block 154 attached to hinge 132.

The hinge and pivots 129, 131, 132, 133 are joined together with hinge pin 155 so that the plate 128 pivots around hinge pin 155 and is locked in place using the threaded aperture, such as aperture 156 in block 153.

Many different means may be used for receiving the sheared material at the stacker end. For example, dollies may be used or alternatively mobile rollers, such as shown in FIG. 1 at 157, could be utilized. The mobile roller unit includes an anchor strip 158, which is either laid or attached to the floor and acts to anchor the roller to the floor to keep it from moving around when material is dropped thereon. Castors, such as end castor 159 and middle castor 160 are provided to assure the mobility of the rollers. The roller units also have the rollers 161 mounted on frame 162.

Means are provided to act to stop the sheared material in opposition to the tampering plate. More particularly, stop units, such as unit 163 are provided. The stop units include a screw clamping arrangement that is a screw handle 164, a clamping rod 166, which passes through a clamping base 167 and is threaded at the end into a bottom plate to thereby pull up the bottom plate and clamp onto the roller frame. The stop units thus can be positioned as desired according to the size of the material being sheared.

Connecting bridges are also attached at the stacker end of the roller units to assist in causing the material to fall from the conveyor onto the rollers. For example, bridge unit 167 is shown for accomplishing this function. The bridge unit comprises a top bias plate 168, which is attached to a vertical standard 169 that is in turn attached in any well known means to the roller assembly.

Figure 9:
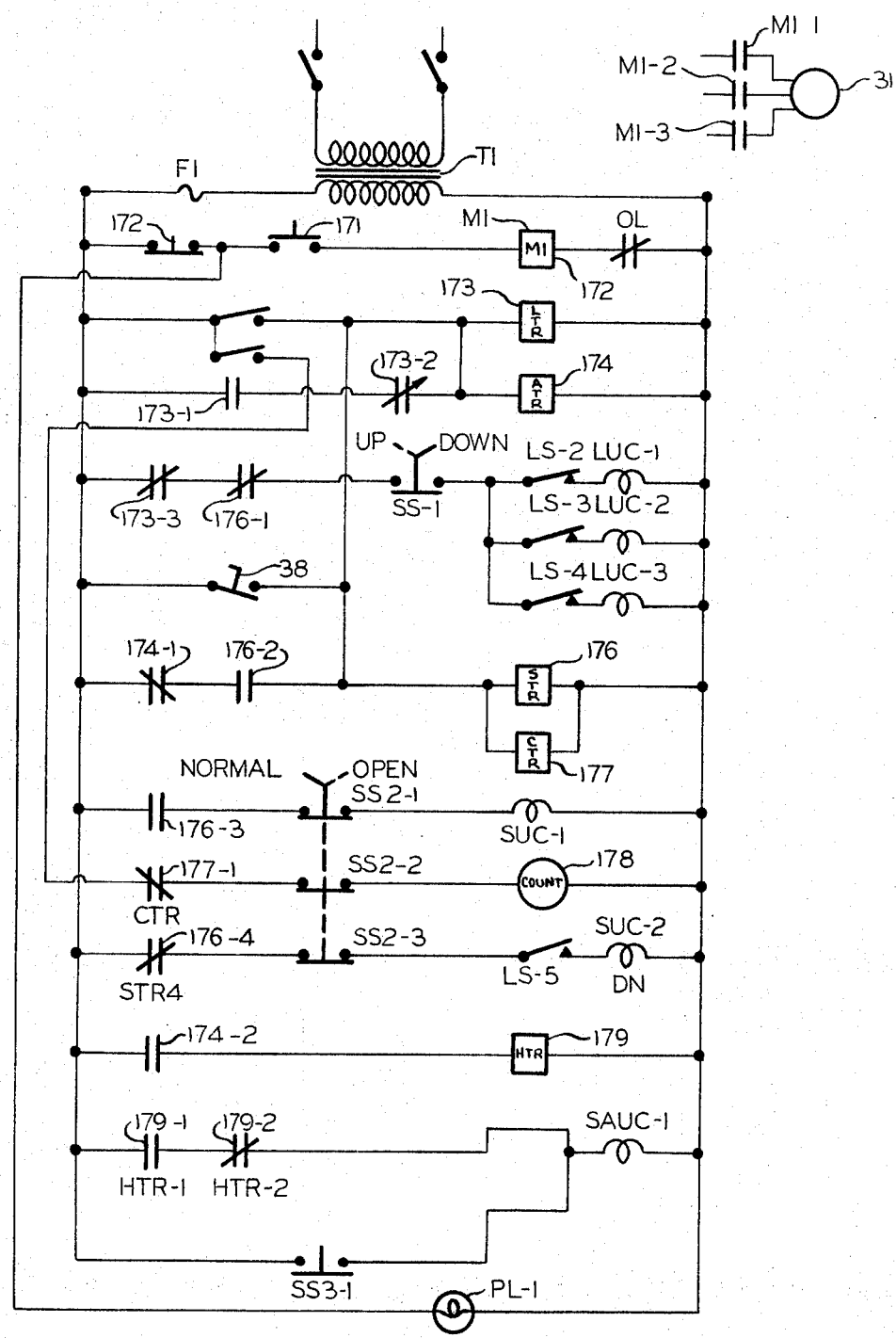
FIG. 9 is a schematic diagram showing the electrical control circuitry.

The electrical circuitry of FIG. 9 helps to describe the operation of the inventive conveyor system. More particularly, the three phase motor 31 is started responsive to the operation of the start switch 171 over a circuit that receives power through transformer T1, fuse F1 and through overload contact 172 and motor actuator M1. The start switch remains closed as long as current is flowing over the start circuit. A stop switch 172 is provided to open the circuit and cut off current from the motor. The motor is a three phase motor and receives its energy over the contacts M1-1, M1-2 and M1-3 when actuator M1 is energized.

Limit switches are employed to detect motion of the ram that actuates the shear blade. For example, limit switch LS1 is operated responsive to the movement of the ram. Thus, responsive to the movement of the shear, an obvious circuit is closed extending through a support unit timing relay 173. The timing relay 173 is a slow to operate relay. In a preferred embodiment of the invention, it operates 2 seconds after its actuation. That is, selected contacts on timing relay 173 operate only after a 2 second delay. Thus, timing relay 173 is energized responsive to the operation of the shear to close normally open contacts 173-1. The closure of contacts 173-1 establish a circuit through normally closed contacts 173-2. It is contacts 173-2 which remain closed for a 2 second delay period after the operation of relay 173.

Auxiliary timing relay 174 also operates responsive to the operation of limit switch LS1. Relay 174 has a 3 second off delay associated with one of its contacts. The timing relay 173 controls the coils of the valves associated with the support unit cylinders. Thus, as shown, with the selector switch SS-1 operated to the "up" position to close the circuit extending over normally closed contacts 173-3 and 176-1, through limit switch contacts LS2, LS3 and LS4, valve coils LVC-1, LVC-2 and LVC-3 on the control valves used for controlling the cylinders that actuate the support units are energized to keep the support units in the "up" position.

Responsive to the operation of timing relay 173, normally closed contacts 173-3 open to remove the operating circuit which holds the support units in their normally upward extended position. It should be noted that the limit switches LS-2, LS-3, and LS-4 are normally closed; however, they are open as long as sheet material is passing over the lift units associated with the particular limit switch. This assures that the control valves LVC-1, LVC-2, and LVC-3, respectively, do not operate to cause the lift units to extend to the upraised position while metal is passing over the lift units.

Means are provided for operating the scrap separator blade 37. More particularly, foot switch 38, when operated, completes a circuit which energizes time delay relays 176 and 177 connected in parallel. Responsive to the operation of relays 176, contacts 176-1 open. The opening of contacts 176-1 is further assurance that the lift units will not be operated to extend to the upright position, when the scrap blade is open awaiting material on the conveyor to fall into the scrap bin.

The operation of relay 176 also causes normally open contacts 176-2 to close. The closing of contacts 176-2 occurs prior to the opening of contacts 174-1, and thus the scrap blade time delay relay 176 remains operated until contacts 174-1 close.

Further responsive to the operation of relay 176, contacts 176-3 operate after a 3 second delay. This gives time for the material on the conveyor to come to the end of the conveyor. Then, the "up" coil of the valve associated with the scrap blade cylinder is energized through the normally open contacts 176-3 in the closed condition and a pair of contacts SS2-1 of stepping switch 2, which are operated from the control panel to prepare the circuitry for enabling operation of the scrap blade.

Means are provided for noting the number of operations performed. More particularly, a counter 178 is provided, and it is energized through a circuit that extends through contacts LS1–2 on limit switch LS1, and normally open contacts 177–1, which are closed while the counter timing relay 177 is operated. The counter timing relay provides an off delay of one-half second for its contacts 177–1. The counter timing relay 177 operates simultaneously with the scrap gate timing relay, since it is in parallel to it to provide an off delay of one-half second where the scrap blade timing relay 176 provides an off delay of 3 seconds. Thus, the counting timing relay 177 is energized responsive to the operation of the foot switch 38 and remains energized through contacts 174–1 on the auxiliary timing relay 174 and contacts 176–2 on the scrap blade timing relay.

The operation of the counter timing relay 177 acts to prevent the count. Thus, when the foot switch 38 is operated because a scrap piece is coming through, the count of the scrap is not wanted. The operation of the foot switch 38 causes counting relay 177 to operate after one-half second which is prior to the operation of limit switch LS1, so that contacts 177–1 open to prevent the counter 178 from counting the scrap piece. Hence, as the scrap is put through the shear, the foot switch 38 acts to lower the lift arms through the responsive operation of the lift arm timing relay 173 over an obvious circuit and also acts to operate the scrap blade timing relay 176 along with the counter timing relay 177. Thus, the lift arms are lowered, the scrap blade is lifted, and the counter 178 is disconnected from the circuit by the operation of foot switch 38.

When scrap blade timing relay 176 is deenergized, responsive to the release of the auxiliary timing relay 174, and the consequent reopening of contacts 174–1 which occurs approximately 3 seconds after the deenergization of relay 176, contacts 176–3 open and contacts 176–4 close. The opening of contacts 176–3 removes energy from the up scrap blade valve control coil SVC-14 1. The closing of contacts 176–4 completes the circuit to scrap blade valve control coil SVC–2 which actuates the blade back to the down position covering the scrap bin. The energization circuit through the down scrap valve control coil SVC–2 includes contacts 176–4, selector switch contacts SS2–3 and limit switch LS–5. The limit switch LS–5 is operated to the closed position responsive to the blade 37 being in the up position to enable energization of the down valve control coil SVC–2 through the circuit described immediately hereinabove. When the blade is down, the limit switch LS–5 is open. The up and down operation of the scrap blade can be manually accomplished using stepping switch SS2.

It is beneficial to have the tamper blades align the stacks after each newly cut piece is dropped to the top of the stack. Means are provided for automatically accomplishing this. More particularly, a stacker alignment timing relay 179 is provided, which is energized responsive to the operation of the auxiliary timing relay over normally open contacts 174–2. Whenever relay 174 is energized, contacts 174–2 close. A three second delay occurs in the opening of contacts 174–2 after the de-energization or release of relay 174. Thus, relay 179 is energized for at least 3 seconds after the energization of relay 174.

Responsive to the energization of relay 179, contacts 179–1 and 179–2 close. The contacts 179–1 are held closed for a half second after the release of relay 179. Thus, when contacts 179–2 open and contacts 179–1 close, there is still no circuit extending to the stacker alignment valve coil SAVC–1. However, for one-half second after the release of relay 179, the stacker alignment valve control coil SAVC–1 is energized causing the tamper plate to move to abut the stack to push any newly cut sheets that are out of alignment into alignment.

Means are provided for manually operating the tamper blade. More particularly, contacts or stepping switch SS–3, which are normally opened are provided to manually energize the stack alignment valve coil, if it is so desired.

Means are provided to indicate the normal operating conditions of the control circuit. For example, pilot light PL1 is shown which indicates that there is power to the motor starter. Other pilot lights may be used as desired.

In operation, the stacker assembly is wheeled up to the back of the shears. The control panel is operated by placing stepping switch SS1 into the up position and stepping switch SS2 into the normal position. The start switch 171 is operated starting the conveyor motor, which operates the conveyor chains.

The piece of metal to be sheared is placed into the shears, and the first cut is taken, which is normally scrap so that simultaneously with the first cut, foot switch 38 is operated. The shear ram operates also so that limit switch LS1 is operated. The support unit timing relay 173 operates along with auxiliary timing relay 174. The operation of the two timing relays 173 and 174 causes the support unit to go into its down position.

The operation of switch 38 causes scrap blade and counter timing relays 176, 177 to operate the scrap blade to the upper position and to inhibit the counter. The scrap piece first cut falls down into the scrap bin.

At the second cut, relays 173 and 174 are again operated causing the lowering of the scrap blade and once again causing the lowering of the support units. As the cut piece passes over the support unit and is taken by the conveyor chains past the scrap blade (in its down position) and on to the stacker.

The stacker tamper plate is automatically pushed against the newly cut piece, which causes the newly cut piece to be pushed against a back up or stationary tamper plate on the other side of the stationary tamper blade. The movable and stationary tamper blades are set at the desired angles for the type of cut being made.

It should be understood that because of the different size chains it is possible for shear cuts to provide two different size cut materials simultaneously, and for the stacker to handle more than one size cut at a time.

The counter is arranged to count each piece of metal. If another shape of material is to be cut, it is easy to change the angle of the tamper blade to accommodate the different size. It is only necessary to remove the pin or screw which screws in the aperture 156 and readjust the top plate to align another hole with the threaded aperture 176 on the top of the hinge plate.

While the principles of the invention have been described above in connection with specific apparatus and applications, it is to be understood that this description is made only by way of example and not as a limitation of the scope of the invention.

I claim:

1. A stacker assembly for use in conjunction with shears,
   said stacker assembly comprising a conveyor unit for moving sheared material from the back of the shear to a stacking station,
   supporting means on said conveyor unit for supporting said material before it is cut while it is being positioned in the shear,
   means for lowering said supporting means during the cut while the cut material is passing thereover on the conveyor unit,
   means for separating scrap from the sheared material, and
   means for stacking the sheared material in orderly stacks,
   said last named means comprising means for accommodating a plurality of different shapes and sizes of material.

2. A stacker assembly of claim 1 wherein said means for lowering said supporting means during the cut and while the cut material is passing thereover on the conveyor unit consists of camless means.

3. The stacker assembly of claim 2 wherein said camless means comprises a transfer shaft means,
   link means fixedly attached to said shaft means,
   cylinder ram means coupled to said link means so as to cause said shaft means to selectively rotate responsive to the extension or retraction of the said ram means, and valve means for controlling said ram means to automatically lower said supporting means during the cut and while the cut material is passing thereover.

4. The stacker assembly of claim 2 wherein said last named means includes surge tank means integral thereto, and wherein timing means are provided for automatically operating said means for separating scrap from the sheared material after a predetermined time period.

5. The stacker assembly of claim 1 wherein said conveyor unit comprises a plurality of endless chains,
said chains extending lengthwise on said conveyor unit, and wherein at least one of said plurality of chains is of a different width than the other of said plurality of chains, whereby said conveyor unit can simultaneously handle sheared material of different sizes.

6. The stacker assembly of claim 1 wherein said stacking means comprises a mobile rail section,
said mobile rail section having tube means extending the width thereof,
a saddle rail assembly slidably mounted to said rail means,
means for locking said saddle rail assembly into a selected place on said rail section,
saddle and bracket tamper assembly means coupled to said saddle rail assembly,
said saddle bracket and tamper assembly comprising a tamper plate,
means for reciprocatingly moving said tamper plate in a transverse direction so that said tamper plate abuts the sheared material on the stacker, and
means for adjusting the angle of the tamper plate.

7. The stacker assembly of claim 6 wherein said means for adjusting the angle of said tamper plate comprises a locking plate connected to said tamper plate,
a plurality of holes arcuately spaced on said locking plate,
means for rotating said tamper plate and said locking plate about a hinge pin parallel to said tamper plate to change the angle of said tamper plate,
fixed aperture means located for selective alignment with any of said arcuately spaced holes in said locking plate as said locking plate rotates,
locking pin means sized to fit through said aligned one of said arcuately spaced holes and said fixed aperture for locking said locking plate and tamper plate into the selected angular position.

8. The stacker assembly of claim 1 wherein said stacking means includes surge tank means integral thereto.

9. A stacker assembly for use in conjunction with shears,
said stacker assembly comprising a conveyor unit for moving sheared material from the back of the shear to a stacking station,
supporting means on said conveyor unit for supporting said material before it is cut while it is being positioned in the shear,
means for lowering said supporting means during the cut while the cut material is passing thereover on the conveyor unit,
means for separating scrap from the sheared material,
means for stacking the sheared material in orderly stacks, and
said last named means including surge tank means integral thereto.

10. The stacker assembly of claim 9 wherein said stacking means comprises a portable rail assembly,
said rail assembly comprising transverse hollow rail means,
said stacker assembly using electrically controlled fluid valves and rams for operating said system, and
said hollow tube means being connected to said fluid means to act as the surge tank means.

* * * * *